3,490,806
CONTACT LENS DIGITAL APPLICATOR
Ana Lopez-Calleja, 59 NE. 2nd St. 33132, and Luis P. Saenz, 955 SW. 1st St. 33130, both of Miami, Fla.
Filed Dec. 7, 1967, Ser. No. 688,768
Int. Cl. B66c *1/00;* A47f *13/06;* A47j *45/00*
U.S. Cl. 294—1                                    2 Claims

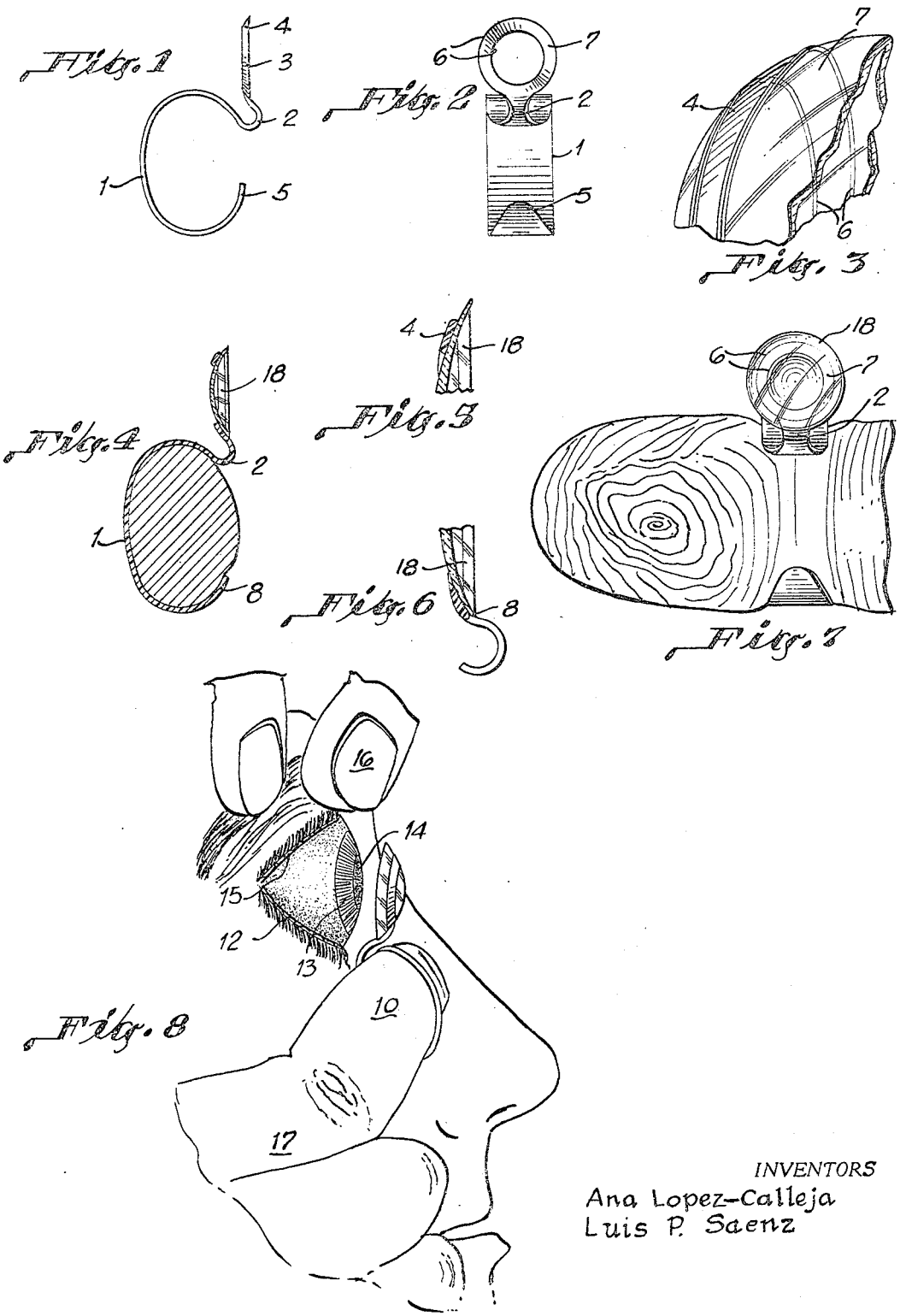

ABSTRACT OF THE DISCLOSURE

An applicator for contact lenses having an open oval loop through which the user inserts a finger tip.

---

This invention concerns optical science, within the field of optometry and relates to the application or adaptation of contact lenses to the human eye by means of a digital applicator. In its more specific aspects, the invention relates to such an applicator, and the nature and objects of the invention will be readily recognized and understood by those skilled in optics, in the light of the following explanation and detailed description illustrated in the accompanying drawings which portray what we at present believe to be the preferred form or mechanics of our invention.

The digital applicator is composed of a one piece unit, which may be produced from any kind of flexible and elastic plastic material. This digital applicator is intended primarily for manipulation by the user of the contact lenses and he does so by placing the lenses, one at a time, upon the applicator and transferring each of them successively to the desired position upon his eyes. This digital applicator is described as follows:

(1) A lower section of open oval form which serves as a holder by insertion therein of a finger tip phalanx and resting this finger tip phalanx on the upper cheek and lower eyelid. This lower section has the shape of the letter C, it is flexible and its extremity is rounded so that any size finger may adjust to a firm insertion therein.

(2) An intermediate section which bends backwards a convenient distance and then reverses the bend toward the front and finally bends upwards and in so doing likewise reduces its width considerably so that the flexibility provided by this shape and the reduced width preclude the possibility of exerting undue contact pressure upon the eyeball.

(3) The upper and final section is essentially an annular segment from a spherical surface, with rounded edges. This is the section upon which the contact lens is placed for transport to positioning upon the eye. The out to out diameter of the annular spherical segment is smaller than the out to out diameter of the contact lens and placement of the lens upon the annular segment is facilitated because the upper part of the intermediate section is shaped and dimensioned so that when the lower part of the contact lens is brought down into contact with it, the lens thereupon is properly positioned vertically upon the lens carrier. The radius of the sphere corresponding to the annular segment thereof shall be the same as the radius corresponding to the curvature of the external surface of the contact lens. The circular opening forming the hole of the annular spherical segment has a diameter which is conveniently smaller than the out to out diameter of the contact lens, so that the contact lens may have proper support along a concentric band near its periphery and this central hole is at the same time large enough so that there be no obstruction to the vision in the process of bringing the lens to its proper position upon the eye.

Since the cornea of the human eye has a diameter larger than that of the lens and since the contact lens support is of lesser diameter than the contact lens, upon bringing the lens into contact with the cornea, the applicator deposits the lens upon the eye due to the physical principles of capillarity and atmospheric pressure.

The digital applicator is of small dimensions and is manipulated by the user of the contact lenses. The lens is adhered to the applicator by means of an aseptic liquid film applied to the lens carrier section, placing the lens thereon and bringing it into position by causing it to make contact with the lower stop provided by the upper part of the intermediate section of the applicator. The applicator is thereupon attached to the finger, the finger is rested upon the cheek and lower eyelid with a slight inward giration of the finger towards the eye, while a finger of the other hand holds the upper eyelid. Once in position, the applicator is swung gently towards the eye and meantime the axis of the eye is oriented toward the center of the annular spherical segment opening through the guidance provided by the light or shaft of light rays passing through that circular opening. As the contact lens is brought closer to the eye, the blurred images come into focus progressively and this provides a further indication as to whether or not the contact lens is approaching the proper position upon the cornea.

As is known, a person using contact lenses has first to undergo an eye examination, has to tolerate placement of the contact lenses and has to learn how to put them on and take them off. Placement and positioning of the lens upon the eye is usually performed by adhering the lens upon the index finger tip by a moisture film, transferring it directly thereupon to the cornea, while the outspread fingers of the other hand open and immobilize the upper and lower eyelids, thus clearing the eyeball for placement of the contact lens. Naturally, this practice involves certain difficulties as to finding the exact focal center as well as the necessary care required so as not to exert undue direct finger pressure upon the eyeball (cornea and sclera); there is also the possibility that foreign matter may inadvertently be carried along on the inner surface of the contact lens and produce thereupon irritation and soreness and such mishaps frequently require a certain waiting recovery period before the eye will tolerate the contact lens again. Undoubtedly, since the finger tip being an opaque solid, this normal procedure makes it extremely difficult to position the contact lens with exactitude and there are frequent occasions when the contact lens thereby is not deposited upon the cornea and the person then has to resort to sliding the lens with delicate care up or down or to the side to thus gropingly as it would bring the lens to its proper position and all of this with consequent irritation to the sclera. Some of the mechanisms proposed as a solution to this problem rely on gravity, suction, muscular control or mechanical movements, but all of them are complicated or have defects which make them expensive or inferior and they do not constitute a solution that is simple, of low cost, easy manipulation, precise positioning of the lens and prevention of damage to the eye.

Our applicator eliminates those defects by the manner in which it solves the question of placing, adapting and centering the lens. Up to now, no applicator has been produced (proposed) which makes it possible for a person to put on his contact lenses without touching them, to center them by means of the shaft of light piercing the lens and support centers, to gently adapt or place the lens upon the eye or cornea by reason of the sensitive flexibility of the lens carrier stem, which serves as a shock absorber insofar as any pressure exerted upon the cornea by movement of the finger to immobilize his lower eyelid and at the same time hold and position a contact lens of any gradation (by reason of the central opening in the lens carrier) and to dispense with the need of adhering the lens to the fingertip.

Our invention is the result of lengthy studies and testings on ourselves, bringing this device to a maximum degree of perfection, basing our work on the great knowledge and experience that we have in the contact lens field, as well as the fact that by reason of a cataract operation the use of contact lenses is mandatory for one of us. As co-inventors we consider that this applicator fills a present need among users of contact lenses and that it will constitute a decided factor toward their well being. It is also our purpose to offer the users of contact lenses a new digital applicator, as the one explained above, which can be utilized in the repeated daily operation of placing the lens upon the eye.

With the foregoing description of the purpose, features and general description of the applicator, as well as the details and illustrations provided in the accompanying drawings; it will be apparent that this invention entails certain novel features in design, construction, mounting and combination of elements.

With reference to the accompanying drawings:

FIG. 1 is a lateral or transverse view of the digital applicator.

FIG. 2 is a front view of the digital applicator.

FIG. 3 shows a part of the virtual spherical shell from which is derived the annular segment which constitutes the lens carrier.

FIG. 4 is a cross section view of the digital applicator with the contact lens adhered to it in the correct position.

FIG. 5 is a detail of the cross sectional view showing adherence of the contact lens to the carrier ring.

FIG. 6 is a detail of the cross sectional view showing the intermediate section of the applicator, the base of the carrier ring and the manner in which the contact lens is positioned at the correct height upon the carrier ring by having the lower part of the contact lens come into contact with the upper part of the intermediate section of the applicator.

FIG. 7 is a front view of the applicator as it is held by the end phalanx of the finger.

FIG. 8 is a perspective view of face, eye, fingers and applicator in the process of positioning the contact lens upon the cornea.

In the accompanying drawings we are using number 1 to designate the holder; number 2 the intermediate section or throat of the applicator; number 3 the lens carrier; all of these firmly joined together and constituting one piece. The holder, number 1, may be made of any kind of material which is flexible and elastic so that it can adjust itself firmly to the finger upon insertion of the end phalanx No. 10 of the finger of any hand. This holder is in the form of an open oval and permits adaptation at any part of the finger and the open part of the oval allows the finger tip 11 to contact the cheek and immobilize the lower eyelid 12 for positioning the lens 18. The holder is rounded at the free end 5 which exerts enough pressure upon the finger 10 to firmly attach the applicator thereto and the upper end of the holder section joins the throat 2; which constitutes another essential section of the applicator. This throat section is likewise made of flexible and elastic material and is of reduced width between the holder 1 and the lens carrier 3 and said throat 2 by reason of its reduced width will prevent exertion of undue pressure upon the cornea 13 when the lens 18 contacts the cornea 13 since any undue excessive pressure will be absorbed by the flexibility of said throat 2. The throat 2 also serves to stop the lens 18 from sliding downwards past point 8 which serves as a support point to the contact lens and which, by reason of its curved shape, does not irritate the lower eyelid 12 even in the event that it comes in contact with it, since the throat is likewise made of plastic, flexible and elastic material. The lens carrier 3 is likewise made of the same material and has the shape of an annular segment of a spherical shell 4, joined to the throat 2 which has a top which serves as a resting point in supporting the lens. The lens carrier has an interior curvature of the same radius as that of the outer lens face which it is to carry, its inner surface 7 being concave and its outer surface 4 being convex. The central open area 9 of the spherical segment allows focusing the vision when it is distant from the eye and when the lens is nearing its proper position on the cornea it allows movement of the pupil 14 so that centering the lens into position is automatic. The very instant that vision is established with a clear focus is the sign that the lens 18 has reached its proper position of placement and adaptation upon the cornea 13 and that, therefore, the applicator may be removed. Also, the open central area 9 of the lens carrier makes it possible for the lens to have any central bulge. The edges 6 of the applicator are beveled and rounded, so that they offer no resistance to movement of the upper eyelid 15 if such be inadvertently the case, which should not occur since in this procedure the finger 16 of one hand is free to occupy itself in immobilizing the upper eyelid while the finger 17 of the other hand can immobilize the lower eyelid and manipulate the applicator.

We believe that this new digital applicator can be manufactured in a mold or die, stamped and formed in one piece within the die or mold.

We claim:

1. An applicator for contact lenses comprising a lens carrier and a holder for said carrier, said holder constructed of one piece of material, comprising an oval shaped, finger fitting structure having a gap in one side, said structure having two ends, one of said ends ending at said gap, the other of said ends continuing in a reverse bend and terminating at said lens carrier, the said holder being in a single plane at right angles to the face of said carrier.

2. The structure of claim 1 in which the junction of said holder and the said carrier comprises a lens stop.

References Cited

UNITED STATES PATENTS 3,132,887   5/1964   Martinez _____ 294—1

ANDRES H. NIELSEN, Primary Examiner